March 21, 1950 E. H. WHITE 2,501,245
CONTROL MECHANISM
Filed March 14, 1946 2 Sheets-Sheet 1
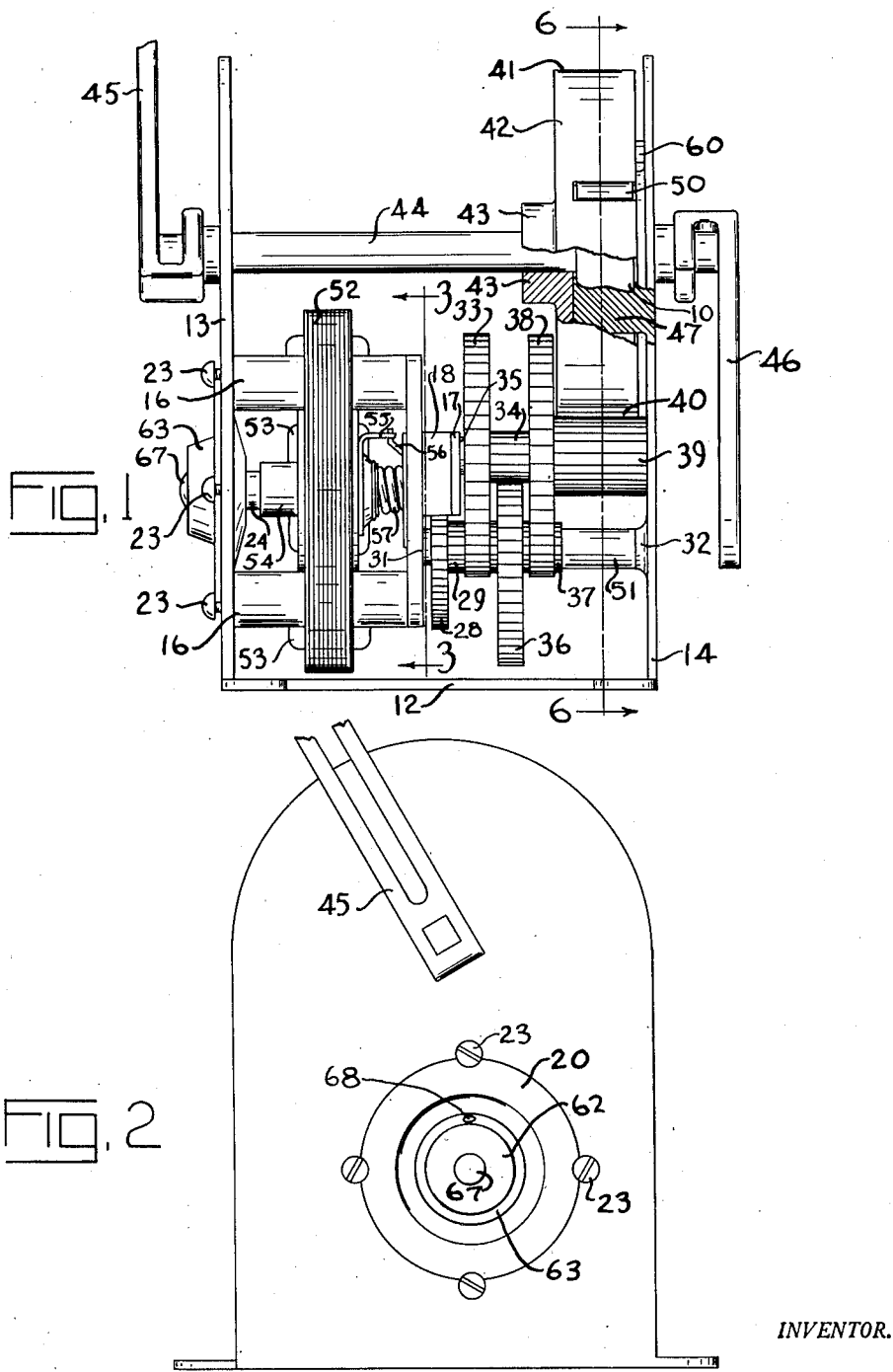
INVENTOR.
EVERETT H. WHITE
BY
G. H. Braddock
ATTORNEY March 21, 1950 E. H. WHITE 2,501,245
CONTROL MECHANISM
Filed March 14, 1946 2 Sheets-Sheet 2
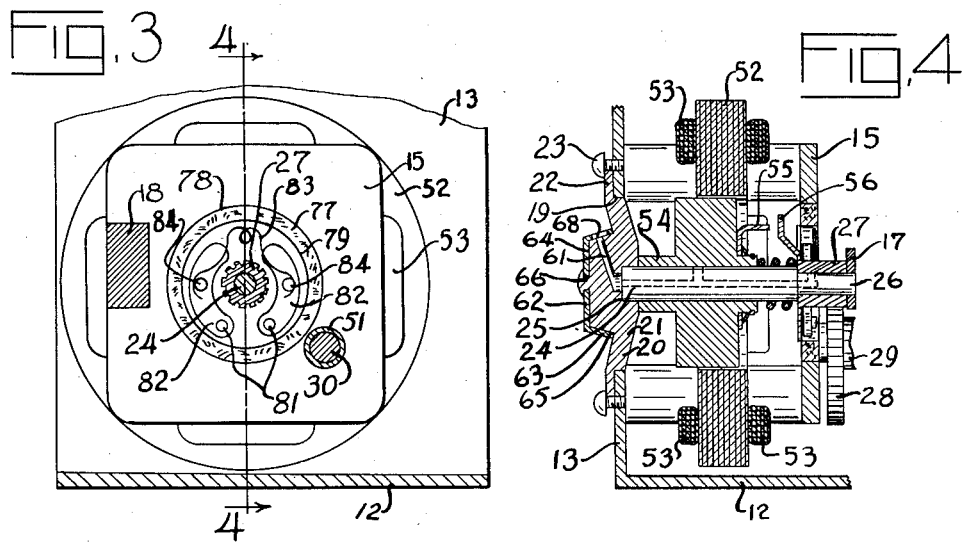
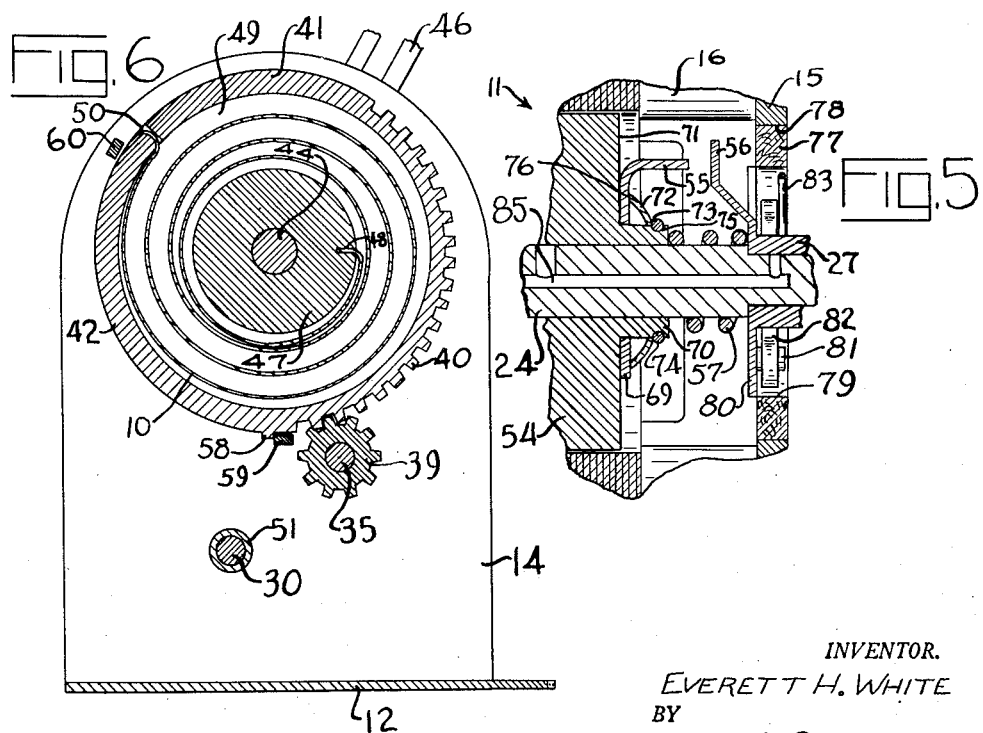
INVENTOR.
EVERETT H. WHITE
BY
G. H. Braddock
ATTORNEY Patented Mar. 21, 1950

2,501,245

UNITED STATES PATENT OFFICE 2,501,245

CONTROL MECHANISM

Everett H. White, St. Paul, Minn.

Application March 14, 1946, Serial No. 654,237

16 Claims. (Cl. 318—160)

1

The present invention has relation to a motor-and-spring operated mechanism for controlling a damper, valve, or equivalent device, or device of similar nature.

An object of the invention is to provide a motor-and-spring operated control mechanism which will be of novel and improved construction.

A further object is to provide a motor-and-spring operated mechanism for controlling a damper, valve, etc., wherein will be incorporated various desirable and improved features and characteristics of construction which will be novel both as individual entities of said mechanism and in combination with each other.

And a further object is to provide a control mechanism which will include features and characteristics of construction as hereinafter set forth.

With the above objects in view, as well as others which will appear as the specification proceeds, the invention comprises the construction, arrangement and combination of parts as now to be fully described and hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 1 is a side elevational view of a control mechanism made according to the invention, parts being omitted, other parts being broken away and still other parts being in section;

Fig. 2 is an end elevational view of the control mechanism as it would appear from the left in Fig. 1;

Fig. 3 is a sectional view, taken on line 3—3 in Fig. 1;

Fig. 4 is a sectional view, taken on line 4—4 in Fig. 3;

Fig. 5 is an enlarged fragmentary sectional view corresponding with the disclosure of Fig. 4; and Fig. 6 is a sectional view, taken as on line 6—6 in Fig. 1.

The embodiment of the invention herein illustrated and described has been devised to be more especially useful as a control mechanism for dampers adapted to be manipulated between two positions, viz., a closed position and an open position. It is to be understood, however, that the mechanism which the invention presents can be employed to the purpose of controlling valves, or other devices, adapted to be manipulated between a closed, first or normal position and an open, second or abnormal position. In any installation of the new and improved control mechanism there will be included means, constituted as a spiral or clock spring 10 in the disclosure as made, for biasing a device (not shown), such as a damper or a valve, to a first or normal position, and an electric motor, such as the electric motor 11, adapted to be energized to cause said device to be moved against the action of the biasing means to a second or abnormal position and to cause the device to be held in said second or abnormal position as long as the electric motor is energized and to be released to the action of the biasing means upon deenergization of said electric motor.

A case or cover for suitably and conveniently housing operative parts of the control mechanism includes a base 12 and spaced apart, parallel end walls 13, 14 upon said base. Desirably, the case or cover also will include spaced apart side walls and a top wall which will connect marginal portions at the sides and tops of the end walls 13, 14. The side walls and top wall of the case or cover have been omitted from the drawings.

A rectilinear panel 15, in spaced, parallel relation to the end walls 13, 14 between said end walls, is rigidly supported upon said end wall 13 by spaced apart posts 16 extending between the end wall 13 and said panel 15, and an oblong panel 17, in spaced parallel relation to the rectilinear panel 15 and the end wall 14 between said rectilinear panel and end wall 14, is rigidly supported, as by a block 18, upon the rectilinear panel 15.

An annular opening 19 in the end wall 13 is covered by an annular closure element 20. More explicitly, a central, annular portion 21 of increased thickness of the annular closure element 20 is fitted into said annular opening 19, and a marginal, annular portion 22 of reduced thickness of said annular closure element 20, in surrounding relation to the central, annular portion 21, is held to the outer surface of said end wall 13 by spaced apart screws 23.

One end portion of a stationarily mounted shaft 24, in spaced, parallel relation to the base 12 of the case or cover, is fixedly supported, as at 25, in the central, annular portion 21 of the annular closure element 20, and the opposite end of said stationarily mounted shaft 24 is fixedly supported, as at 26, in the oblong panel 17.

A pinion 27 freely rotatable upon and fixed against longitudinal movement relative to the shaft 24 meshes with a gear 28 of a reduction gear train of the control mechanism. The gear 28 is rigid with a pinion 29, and said gear 28 and pinion 29 are rotatably supported upon a stationary shaft 30, in spaced, parallel relation to said base 12, having one of its ends fixedly supported, as at 31, upon the rectilinear panel 15 and its opposite end fixedly supported, as at 32, upon the end wall 14.

The pinion 29 meshes with a gear 33 rigid with a pinion 34, and said gear 33 and pinion 34 are rotatably supported upon a stationary shaft 35, in spaced, parallel relation to the base 12 and the stationary shaft 30, having one of its ends fixedly supported upon the oblong panel 17 and its opposite end fixedly supported upon said end wall 14.

The pinion 34 meshes with a gear 36 rigid with a pinion 37, and said gear 36 and pinion 37 are rotatably supported upon the stationary shaft 30. A tubular spacer upon said stationary shaft 30, between the pinion 30 and the end wall 14, is denoted 51.

The pinion 37 meshes with a gear 38 rigid with a pinion 39, and said gear 38 and pinion 39 are rotatably supported upon the stationary shaft 35.

The pinion 39 is in mesh with externally arranged gear teeth 40 upon an outer, annular element 41 of a cylindrical entity 42, and a hub 43 of said cylindrical entity 42 is fixedly supported upon a crank shaft 44 rotatably mounted in the end walls 13 and 14. Cranks denoted 45 and 46, upon the crank shaft 44, for controlling dampers in the disclosure as made, are situated at the outer sides of the end walls 13 and 14.

A hub 47 is fixed upon the inner surface of the end wall 14 of the case or cover in surrounding relation to the crank shaft 44, and the interior end of the spiral or clock spring 10 is secured, as at 48, to said hub 47. The length of said spiral or clock spring 10 normally is loose upon the hub 47 upon said end wall 14 in surrounding relation to said hub 47 and within an annular concavity 49 of the cylindrical entity 42, and the exterior end of the spiral or clock spring 10 is secured, as at 50, to the outer, annular element 41 of said cylindrical entity 42.

The electric motor 11 includes a stator core structure 52 which supports field coils 53. A rotor 54 of said electric motor 11, rotatably and slidably carried by the stationarily mounted shaft 24, is for driving the reduction gear train disclosed in the drawings and hereinbefore described. The stator core structure 52 and the field coils 53 are between and in spaced, fixed relation to the end wall 13 and the rectilinear panel 15, and said stator core structure is in surrounding relation to the rotor 54.

A driving element or pin rotatable with the rotor 54 is designated 55, and a driven element or pin integral with the pinion 27 is represented 56.

A compression coil spring 57, upon said stationarily mounted shaft 24 and between the driven element or pin 56 and the rotor 54, is adapted to retain said rotor engaged against the annular closure element 20 and the driving element or pin 55 clear of said driven element or pin 56, in the positions the parts mentioned are disclosed in Figs. 4 and 5 of the drawings, when the electric motor 11 is deenergized, and the rotor 54 is adapted to be moved, against resilient action of the compression coil spring 57, to position in which said rotor is centrally disposed with respect to the field so that said driving element or pin 55 is situated and engaged back of said driven element or pin 56, as the parts mentioned are disclosed in Fig. 1, upon energization of said electric motor.

Assuming one of the cranks, say 45, is for controlling a check damper and the other crank, say 46, is for controlling a draft damper of a furnace, said cranks will be situated in draft damper closed, check damper open positions at all times when the electric motor 11 is deenergized. Stated otherwise, the spiral or clock spring 10 normally will cause the draft damper to be closed and the check damper to be open. In Fig. 6 of the drawings, said spiral or clock spring 10 is urging the cylindrical entity 42 toward rotation in counterclockwise direction so that a stop 58 upon the outer, annular element 41 is biased against a stop 59 upon the end wall 14. The construction and arrangement will be such that when said stop 58 is engaged against the stop 59 a draft damper, controlled by the crank 46, will be closed and a check damper, controlled by the crank 45, will be open.

The electric motor 11 is adapted to become energized when a room or space to be heated by the furnace having draft and check dampers controlled by the cranks 46 and 45 calls for heat, and upon energization of said electric motor the rotor 54 will commence to rotate and also will be moved in direction toward the driven element or pin 56 thus to cause the driving element or pin 55 to become situated and engaged back of said driven element or pin 56. Said driving element or pin 55, as it advances with the motor 54, will push the driven element or pin 56 ahead of it thus to cause the pinion 27 fixed to said driven element or pin to be rotated. In turn, said pinion will, through the instrumentality of the reduction gear train, cause the cylindrical entity 42 to be rotated in clockwise direction, against resilient action of the spiral or clock spring 10, until the stop 58 upon said outer, annular element 41 is engaged against a stop 60 upon said end wall 14. The construction and arrangement will be such that when said stop 58 is engaged against the stop 60 the draft damper will be open and the check damper will be closed. Thereafter, the electric motor 11 will strain to drive the cylindrical entity 42 in clockwise direction as long as said electric motor remains energized.

When the temperature of the room or space becomes satisfied, the electric motor 11 will become deenergized, and upon deenergization of said electric motor the compression coil spring 57 immediately will act to push the rotor 54 along the stationarily mounted shaft 24 in direction away from the driven element or pin 56 thus to cause the driving element or pin 55 to be released from and clear of said driven element or pin 56. The spiral or clock spring 10, which was wound up when the rotor 54 caused the outer, annular element 41 to be rotated in clockwise direction, will unwind and cause the cylindrical entity 42 to be rotated in counterclockwise direction, back to its position as in Fig. 6, upon deenergization of the electric motor 11 and consequent separation of the driving and driven elements or pins 55 and 56.

It will be apparent from the description hereinbefore given that the spiral or clock spring 10 is adapted to cause the cranks 46 and 45 to be biased to draft closed, check open position when the electric motor 11 is deenergized, and said electric motor is adapted to be energized to cause said cranks to be moved against the action of the biasing means to draft open, check closed position. The spiral or clock spring 10 evidently will cause the cranks 46 and 45 to be actuated to draft closed, check open position upon deenergization of the electric motor 11 and consequent removal of the driving element or pin 55 from the driven element or pin 56, and separation of the rotor 54 from the reduction gear train will lighten the work required to be done by the spiral or clock spring 10.

Also it will be apparent that upon failure of electric current of a system including the electric motor 11, the draft damper 46 will be moved to closed position by the spiral or clock spring 10.

A lubricating passageway 61 leads inwardly through the central, annular portion 21 of the annular closure element 20 to the end of the shaft 24 in said central, annular portion 21, and a lubricating passageway 85 leads centrally along said shaft 24. In order that the end of the lubricating passageway 61 adjacent the shaft 24 may be the lowermost end of said lubricating passageway in any installation of the control mechanism, no matter what may be the position of the base 12 of the case or cover, said annular closure element 20 is supported upon the end wall 13 for rotational adjustment. It will be noted by reference to Figs. 2 and 4 of the drawings that the screws 23 are without the perimeter of the annular closure element 20 and that the heads of said screws are turned down against the outer surface of the marginal, annular portion 22 of said annular closure element.

A cover for the exterior end of the lubricating passageway 61 consists of a cap member including an annular base 62 and an annular skirt portion 63. The annular base 62 is rotatably supported on a flat annular surface 64 of the central, annular portion 21 of the annular closure element 20, and the annular skirt portion 63 is rotatably supported on a conical, continuous surface 65 of said central, annular portion 21. Said annular base 62 includes a central opening 66, and a headed element 67 in said opening 66 supports the lubricating passageway cover upon the annular closure element 20 for rotational adjustment relative to the conical surface 65. An opening 68 in the annular skirt portion 63 is adapted selectively to be alined with the lubricating passageway 61 and situated clear of said lubricating passageway.

The driving element or pin 55 includes a body portion 69 of disc form rotatably supported upon a reduced annular portion 70 of the rotor 54 adjacent to and parallel with a surface 71 of said rotor in surrounding relation to said reduced annular portion 70 and in perpendicular relation to the rotatable shaft 24. A dish shape, annular spring member 72, having an interior, circular margin 73 thereof arranged upon the reduced portion 70 of said rotor 54 back of a wire ring 74 in an annular groove 75 of said reduced portion and an exterior, circular margin 76 thereof engaged against the surface of the body portion 69 opposite the surface 71 of the rotor, is for causing said driving element or pin 55 to be frictionally clutched between said rotor and said dish shape, annular spring member thus to be rotatable with the rotor. The construction and arrangement will be such that the driving element or pin 55 will be clutched to the rotor 54 under sufficient friction to cause the driven element or pin 56 to be rotated in response to rotation of said rotor under normal conditions of use of the control mechanism, and that the rotor will overcome friction to be slidably rotatable relative to the body portion 69 of said driving element or pin 55 should excessively heavy load suddenly be imparted to said driving element or pin 55.

A brake of the control device includes an annular friction disc 77 having its outer, annular peripheral surface fitted to and secured in a circular opening 78 in the rectilinear panel 15 and its inner, annular peripheral surface 79 arranged in spaced, surrounding, concentric relation to the stationarily mounted shaft 24.

The driven element or pin 56, integral with the pinion 27, includes a body portion 80 of disc form rotatable upon the shaft 24. The body portion 80 rigidly supports a pair of spaced apart trunnions, denoted 81, 81, and each of said trunnions rotatably supports a brake shoe 82. The brake shoes 82, 82 are at diametrically opposite sides of the shaft 24 and the pinion 27 in alined relation with the inner, annular peripheral surface 79 of the annular friction disc 77. An elongated spring 83 having its opposite end portions engaged against the outer sides of lugs 84, 84 upon intermediate portions of the brake shoes 82, 82 normally retains said brake shoes at inward positions upon the trunnions 81, 81 to be situated clear of the inner, annular peripheral surface 79 of the annular friction disc 77. The construction and arrangement will be such, however, that outer, arcuate surfaces of the brake shoes 82, 82 will become engaged with said inner, annular surface 79, against resilient action of the spring 83, in response to centrifugal force resulting from rotational movement of the pinion 27 and the driven element or pin 56 at rate of speed faster than a predetermined rate thus to retard and control the rate of speed of rotation of said pinion 27 and driven element or pin 56 and the cylindrical entity 42. The brake obviously will be operative to control the rate of speed of rotation of said cylindrical entity 42 when the cylindrical entity is driven by either the spiral or clock spring 10 or the electric motor 11.

What is claimed is:

1. In a control mechanism, the combination with spring means for biasing a device to a normal position and stop means for retaining the device in said normal position against the action of said spring means, of an electric motor adapted to be energized to cause said device to be moved against the action of said spring means to an abnormal position, stop means for retaining the device in said abnormal position against the action of said electric motor, a driving connection between said electric motor and said spring means assembled with the spring means, and means including a clutch for connecting said electric motor to said driving connection in response to energization of the electric motor and for disconnecting said electric motor from said driving connection concurrently with and in response to deenergization of the electric motor, said electric motor being adapted to cause said device to be held in said abnormal position against the action of said spring means as long as the electric motor is energized and said device being adapted to be released to the action of the spring means upon deenergization of said electric motor.

2. In a control mechanism, the combination with a rotatable entity and a spiral spring for causing said rotatable entity to be rotated thus to cause a device to be biased to a normal position, of an electric motor adapted to be energized to cause said rotatable entity to be rotated against the action of said spiral spring thus to cause the device to be moved to an abnormal position, a reduction gearing connection between said electric motor and said spiral spring assembled with the spiral spring, means including a clutch for connecting said electric motor to said reduction gearing connection in response to energization of the electric motor and for disconnecting said electric motor from said reduction gearing connection in response to deenergization of said electric motor, the electric motor being adapted to cause said device to be held in said abnormal position against the action of said spiral spring as long as the electric motor is energized and said device being adapted to be released to the action of the spiral spring upon deenergization of said electric motor, stop means for limiting the extent to which said spiral spring can cause the rotatable entity to be rotated, and stop means for limiting the extent to which said electric motor can cause said rotatable entity to be rotated against the action of said spiral spring.

3. In a control mechanism, a shaft, an electric motor including a rotor rotatably supported upon said shaft, a driven element upon said shaft, and a driving element rotatable with said rotor adapted to be engaged with said driven element concurrently with and in response to energization of the electric motor and to be disengaged from the driven element concurrently with and in response to deenergization of said electric motor.

4. In a control mechanism, a shaft, an electric motor including a rotor rotatably supported upon said shaft, a driven element upon said shaft, a driving element rotatable with said rotor, and a compression coil spring upon said shaft between said driven element and said rotor for normally retaining the driven and driving elements in separated relation, said driving and driven elements being adapted to become interengaged in response to energization of said electric motor.

5. The combination as specified in claim 2, and means for controlling the rate of speed of rotation of said rotatable entity.

6. In a control mechanism, a shaft, an electric motor including a rotor rotatably and slidably supported upon said shaft, a driven element rotatably supported upon and fixed against movement longitudinally of said shaft, a driving element movable with said rotor and adapted to become engaged with said driven element in response to sliding movement of said rotor by reason of energization of said electric motor, and a compression coil spring upon said shaft between said rotor and said driven element for normally retaining the driving and driven elements in separated relation.

7. The combination as specified in claim 6 wherein said driving element is clutched to the rotor under sufficient friction to cause said driven element to be rotated in response to rotation of said rotor under normal conditions of use of the control mechanism, and said rotor is adapted to be slidably rotatable relative to the driving element upon the application of excessively heavy load to said driving element.

8. The combination as specified in claim 6, and means frictionally clutching said driving element to said rotor.

9. In a control mechanism, a fixedly supported member, a rotatably supported member in surrounding relation to said fixedly supported member, a spiral spring between and having its opposite ends connected to the fixedly and rotatably supported members, respectively, for causing said rotatably supported member to be rotated thus to cause a device to be biased to a normal position, an electric motor adapted to be energized to cause said rotatably supported member to be rotated relative to said fixedly supported member against the action of said spiral spring thus to cause the device to be moved to an abnormal position, a driving connection between said electric motor and said rotatably supported member, and means including a clutch for connecting said electric motor to said driving connection in response to energization of the electric motor and for disconnecting said electric motor from said driving connection in response to deenergization of the electric motor, said electric motor being adapted to cause said device to be held in said abnormal position against the action of said spiral spring as long as the electric motor is energized and said device being adapted to be released to the action of the spiral spring upon deenergization of said electric motor.

10. The combination as specified in claim 9, stop means for limiting the extent to which said spiral spring can cause the rotatably supported member to be rotated, and stop means for limiting the extent to which said electric motor can cause said rotatably supported member to be rotated against the action of said spiral spring.

11. The combination as specified in claim 10, and means for controlling the rate of speed of rotation of said rotatably supported member.

12. In a control mechanism, a shaft, spring means for biasing a device to a normal position, an electric motor including a rotor rotatably and slidably supported upon said shaft and adapted to be energized to cause said device to be moved against the action of said spring means to an abnormal position, a driven element constituted as a pinion rotatably supported upon and fixed against movement longitudinally of said shaft, a driving element movable with said rotor adapted to become engaged with said pinion in response to energization of said electric motor, a compression coil spring upon said shaft between said rotor and said pinion for retaining the driving element and pinion in separated relation when said electric motor is deenergized, and a reduction gearing connection between said pinion and said spring means.

13. The combination as specified in claim 12, stop means for limiting the extent to which said spring means can cause said device to be moved, and stop means for limiting the extent to which said electric motor can cause said device to be moved against the action of said spring means.

14. In a control mechanism, a shaft, a fixedly supported member, a rotatably supported member in surrounding relation to said fixedly supported member, a spiral spring between and having its opposite ends connected to the fixedly and rotatably supported members, respectively, for causing said rotatably supported member to be rotated thus to cause a device to be biased to a normal position, an electric motor including a rotor rotatably and slidably supported upon said shaft and adapted to be energized to cause said rotatably supported member to be rotated relative to said fixedly supported member against the action of said spiral spring thus to cause said device to be moved to an abnormal position, a driven element constituted as a pinion rotatably supported upon and fixed against movement longitudinally of said shaft, a driving element movable with said rotor adapted to become engaged with said pinion in response to energization of said electric motor, a compression coil spring upon said shaft between said rotor and said pinion for retaining the driving element and pinion in separated relation when said electric motor is deenergized, and a reduction gearing connection between said pinion and said rotatably supported member.

15. The combination as specified in claim 14, stop means for limiting the extent to which said spiral spring can cause the rotatably supported member to be rotated, and stop means for limiting the extent to which said electric motor can cause said rotatably supported member to be rotated against the action of said spiral spring.

16. The combination as specified in claim 1, and means for controlling the speed of movement when the device is released to the action of said spring means.

EVERETT H. WHITE.

REFERENCES CITED

The following references are of record in the file of this patent:

UNITED STATES PATENTS

| Number | Name | Date |
| --- | --- | --- |
| 1,749,004 | Strawn | Mar. 4, 1930 |
| 1,958,884 | Bonanno | May 15, 1934 |
| 2,052,929 | Kronmiller | Sept. 1, 1936 |
| 2,052,987 | Persons | Sept. 1, 1936 |
| 2,164,633 | Barrett | July 4, 1939 |
| 2,222,990 | Shipley et al. | Nov. 26, 1940 |
| 2,408,808 | Paulus et al. | Oct. 8, 1946 |